W. D. JAMES.
YOKE TIE FOR CATTLE.
APPLICATION FILED AUG. 23, 1909.
949,768.   Patented Feb. 22, 1910.
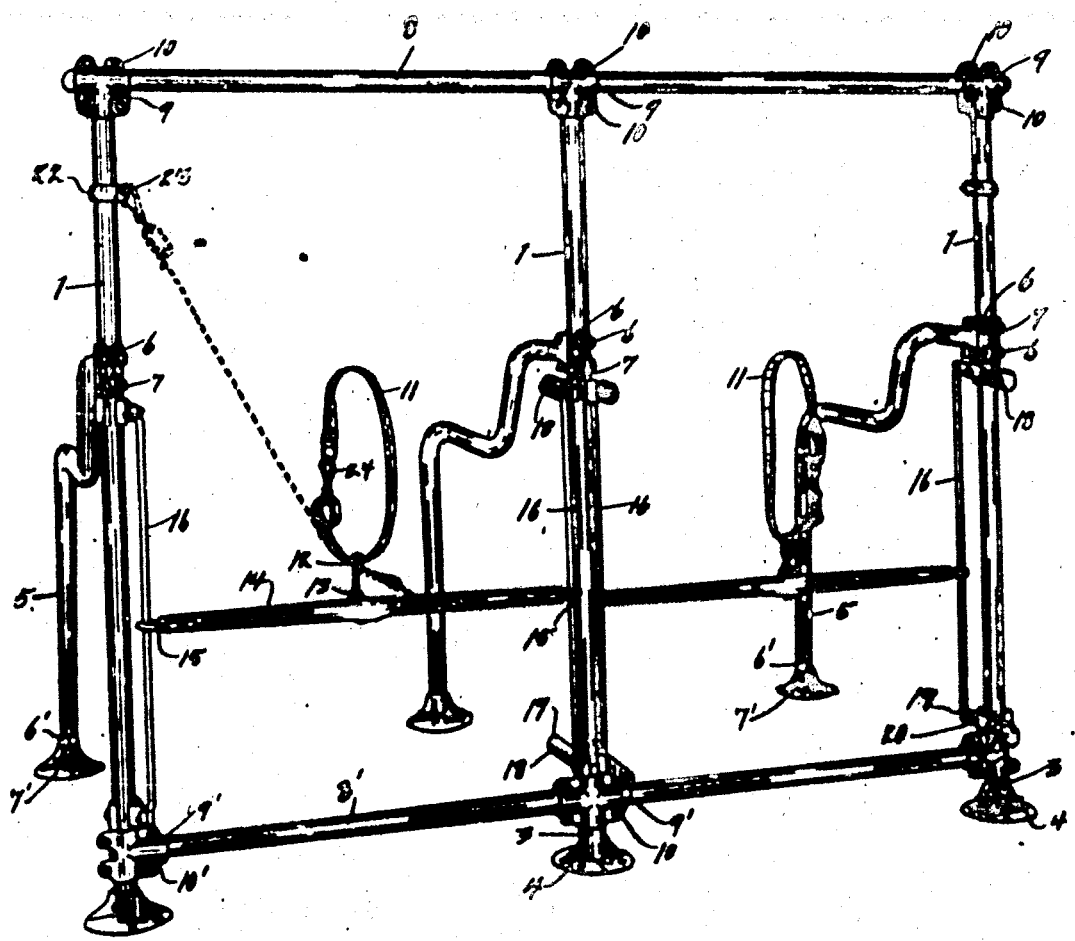
Witnesses
O. R. Owen
Pearl Grothen
Inventor
William D. James
by Everett Wheeler
Attorneys

UNITED STATES PATENT OFFICE.

WILLIAM D. JAMES, OF FORT ATKINSON, WISCONSIN.

YOKE-TIE FOR CATTLE.

949,768.  Specification of Letters Patent.  Patented Feb. 22, 1910.

Application filed August 29, 1909. Serial No. 514,139.

*To all whom it may concern:*

Be it known that I, WILLIAM D. JAMES, a citizen of the United States, residing at Fort Atkinson, county of Jefferson, and State of Wisconsin, have invented new and useful Improvements in Yoke-Ties for Cattle, of which the following is a specification.

The object of my invention is, first,—to provide a device by which cattle may be hitched centrally between two vertical standards. Second, to provide a device by which the hitching member may be freely raised and lowered by the animal, and third, to provide a device by which the hitching members may be adjusted forwardly and rearwardly relatively to the vertical standards, whereby the cattle may be adjusted nearer to or farther from the gutter in rear of the standards.

The construction of my device is further explained by reference to the accompanying drawing, which represents a perspective view thereof showing a plurality of vertical standards connected together and the hitching mechanism connected therewith.

Like parts are identified by the same reference numerals.

1 represents the standards which are preferably made of metal tubing and are supported from the floor of the stable by the sockets 3 and base plate 4.

5 are brace members which are connected at their upper ends to the standards 1 by the clamping plates 6 and bolts 7, and at their lower ends to the floor by the tubular members 6' and base member 7'. The upper ends of the standards 1 are connected together by the horizontal member 8, clamping plates 9 and bolts 10, while their lower ends are connected together by the horizontal member 8', clamping members 9' and bolts 10'.

The parts thus far described are all substantially of ordinary construction.

My invention pertains more especially to the hitching mechanism by which the strap 11 is adjustably connected with the standards 1. The strap 11 is connected to the standards 1 through the links 12 and 13, yoke 14, slidable links 15—15, vertical rods 16, horizontally adjustable plates 17, provided with a plurality of apertures 18, rod supporting bolts 19 and plate supporting bolts 20.

It will be understood that when the animal to be hitched is longer than the ordinary, the vertical rods 16 are preferably adjusted in front of the standards 1, as shown upon the left side of the drawing, and when the animal is shorter than the ordinary, the rods 16 are adjusted in rear of standards 1, as shown upon the right side of the drawing, whereby animals of different lengths may be hitched in alinement with the gutter formed in the floor upon which they stand, and said rods 16 may be adjusted forwardly or backwardly at any intermediate point, corresponding with the distance between the several apertures of the series 18 formed in the adjustable plates 17.

The hitching member 11 is adapted to be secured around the neck of the animal in the ordinary manner by a buckle or snap hook and link as shown. It will be understood when the hitching member is thus secured to the animal, the animal will be free to move its head upwardly or downwardly at will a distance corresponding with the length of the vertical rod 16, with which the yoke 14 is slidably connected at its respective ends, also that the animal will be free to move its head to the right or left a distance corresponding with the length of the strap 11, while it will be limited in its lateral or forward and backward movement by the yoke and yoke retaining members.

As a means for supporting the yoke 14 and strap 11 in a convenient position to be reached when removed from the neck of the animal, I preferably provide the standards 1 with a supporting collar 22, which is clamped to the standards by the bolt 23, which bolt serves as a convenient place of attachment for the snap hook 24 of the hitching strap, as indicated in dotted lines on the left in the drawings.

While I have shown and described my supporting standards and braces as preferably made of tubing and connected together by bolts and clamping plates, I do not wish to confine or limit my invention to the material employed for such parts, as the same may be made of wood or of solid metal as circumstances may require.

It will be understood that when several standards 1 have been connected together in a series, the end standards of such series are each provided with but one yoke supporting rod 16, but that each intermediate standard 1 between the ends is provided with two yoke supporting rods 16, whereby a separate rod 16 is provided for each end of each yoke in the series, whereby each yoke in the series is free to be moved upwardly and downwardly independently of the others.

Having thus described my invention what I claim as new and desire to secure by Letters Patent, is,

1. In a device of the described class, the combination of a plurality of vertical standards, a plurality of vertical yoke retaining guide rods, means for adjustably connecting the upper and lower ends of the guide rods to said standards, a yoke slidably connected at its respective ends to said rods, and a hitching member centrally connected to said yoke.

2. In a device of the described class, the combination of a series of vertical standards, a vertical yoke retaining guide rod adjustably connected at its respective ends to each of the end standards of said series, two vertical yoke retaining guide rods adjustably connected at their respective ends to each intermediate standard between the respective end standards of the series, a yoke slidably connected at its respective ends to each pair of vertical guide rods, and a hitching member centrally connected to each of said yokes, all substantially as and for the purpose specified.

In testimony whereof I affix my signature in the presence of two witnesses.

WILLIAM D. JAMES.

Witnesses:
W. EICKMANN,
A. N. N. WEND.